United States Patent
Okada et al.

[11] Patent Number: 5,878,022
[45] Date of Patent: Mar. 2, 1999

[54] HIGH DENSITY OPTICAL INFORMATION RECORDING MEDIUM USING HIGH REFRACTIVE INDEX LAYER

[75] Inventors: Mitsuya Okada; Masatsugu Ogawa, both of Tokyo, Japan

[73] Assignee: NEC Corporation, Tokyo, Japan

[21] Appl. No.: 929,790

[22] Filed: Sep. 15, 1997

[30] Foreign Application Priority Data

Sep. 13, 1996 [JP] Japan .................................. 8-242947

[51] Int. Cl.$^6$ ....................................................... G11B 7/24
[52] U.S. Cl. ..................................... 369/275.4; 369/275.1
[58] Field of Search ............................. 369/275.4, 275.1, 369/275.2, 13, 277, 278, 279; 430/321, 320; 428/64.4

[56] References Cited

U.S. PATENT DOCUMENTS

| | | | |
|---|---|---|---|
| 5,406,546 | 4/1995 | Uchiyama et al. | 369/275.4 |
| 5,430,706 | 7/1995 | Utsunomiya et al. | 369/275.4 |
| 5,581,539 | 12/1996 | Horie et al. | 369/275.4 |
| 5,694,379 | 12/1997 | Aratani et al. | 369/13 |
| 5,708,651 | 1/1998 | Sugaya et al. | 369/275.4 |

FOREIGN PATENT DOCUMENTS

| | | |
|---|---|---|
| 61-30329 | 7/1986 | Japan . |
| 63-29341 | 2/1988 | Japan . |
| 63-225945 | 9/1988 | Japan . |
| 5198002 | 8/1993 | Japan . |
| 5198021 | 8/1993 | Japan . |
| 5198022 | 8/1993 | Japan . |
| 5266514 | 10/1993 | Japan . |
| 6150441 | 5/1994 | Japan . |

*Primary Examiner*—Tan Dinh
*Attorney, Agent, or Firm*—Sughrue, Mion, Zinn, Macpeak & Seas, PLLC

[57] ABSTRACT

Disclosed are an optical information recording medium for recording, reproducing and erasing information by emitting laser light with a wavelength in vacuum of $\lambda$, which has: a transparent substrate through which the laser light can be transmitted; a high refractive-index layer which is formed on the transparent substrate; a guide groove for tracking which is formed on the high refractive-index layer; and a recording layer which is formed on the guide groove for tracking; wherein a width W of the guide groove for tracking and a refractive index $n_a$ of the high refractive-index layer are so set that the following relation: $W > \lambda/(2 x n_a)$ is obtained, and an optical information recording medium for reproducing information by emitting laser light with a wavelength in vacuum of $\lambda$, which has: a transparent substrate through which the laser light can be transmitted; a high refractive-index layer which is formed on the transparent substrate; a concave-convex pit which is formed on the high refractive-index layer; and a reflection layer which is formed on the concave-convex pit; wherein a width $W_p$ of the concave-convex pit and a refractive index $n_a$ of the high refractive-index layer are so set that the following relation: $W_p > \lambda/(2 x n_a)$ is obtained.

12 Claims, 6 Drawing Sheets

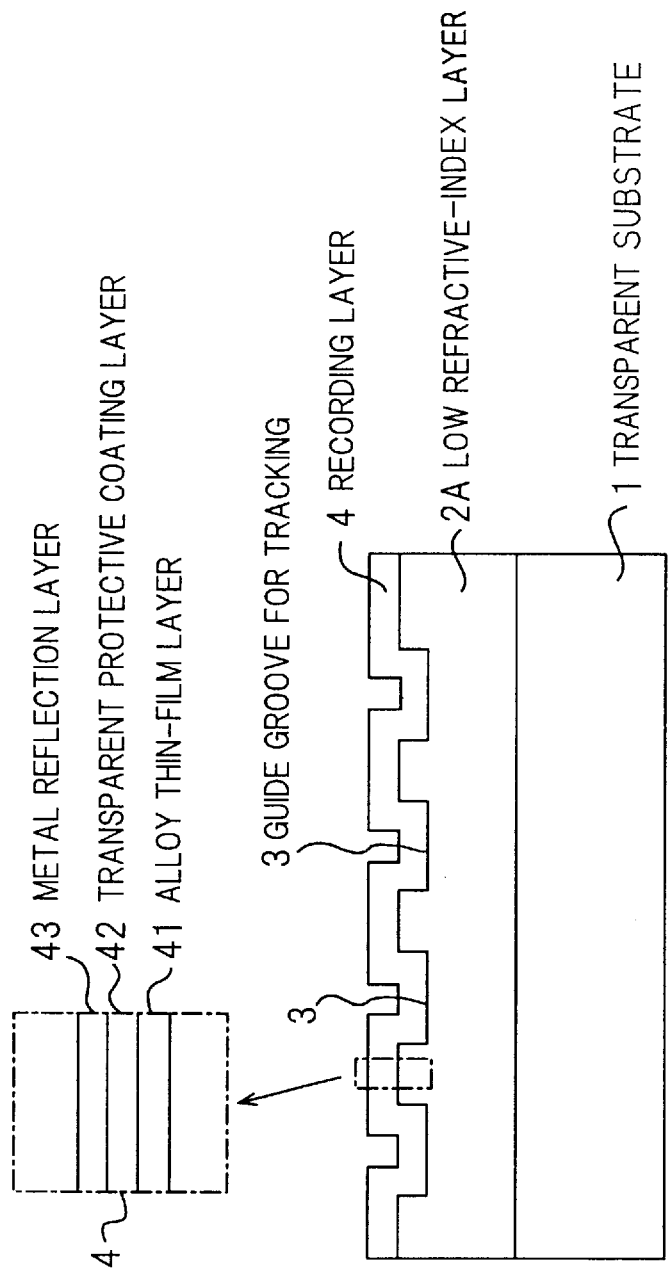
FIG.5 COMPARATIVE EXAMPLE

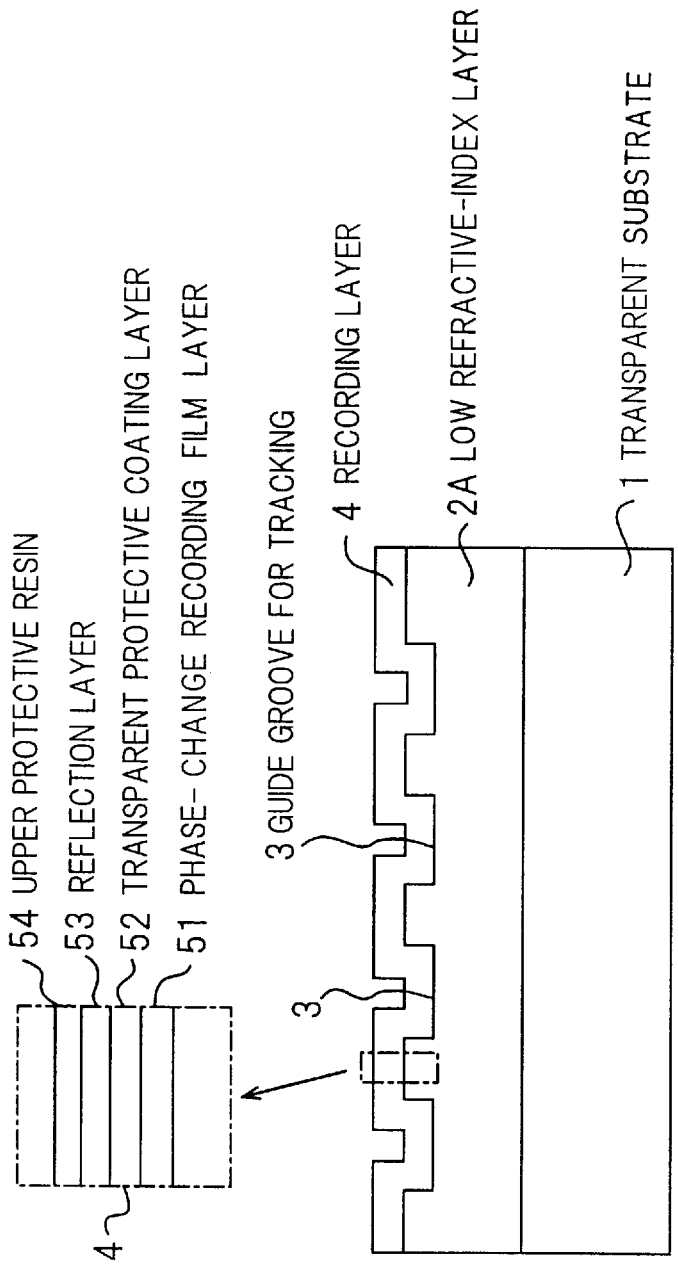
FIG.6 COMPARATIVE EXAMPLE

HIGH DENSITY OPTICAL INFORMATION RECORDING MEDIUM USING HIGH REFRACTIVE INDEX LAYER

FIELD OF THE INVENTION

This invention relates to an optical information recording medium, and more particularly to, an optical information recording medium for recording, reproducing and erasing information by using laser light.

BACKGROUND OF THE INVENTION

Optical disk recording systems, where a large capacity of recording can be achieved and contactless and high-speed access can be performed, have been developed to use as a large capacity memory. Such optical disks are classified into a read-only type such as a compact disk and a laser disk, a recordable-type whose user can record information and a rewritable type whose user can repeatedly record and erase information. The recordable-type and rewritable-type optical disks are used as an external memory of computers or a document and image file. The read-only type, which is rapidly popularized as a data file such as CD-ROM, is used as a high-density recording medium for personal use. Also, due to its large capacity, CD-ROM has been researched to use as a multimedia file including image data by using an image compressing technology such as MPEG2. For this use, a capacity of 650 MB/disk in present CD-ROMs is not sufficient, and a capacity four to eight times this capacity is desired. On the other hand, read-only type image files such as a laser disk have been standardized to contain high-quality high vision images in a CD size so as to provide DVD products. However, its recording time is not sufficient when considering a picture quality. Thus, also in this type, a higher-density medium is desired.

The recordable optical disk has got a certain market in the application field where its merit that recorded information can be safely stored is utilized maximumly. Also in this type, a higher-capacity and higher-density medium is desired.

In the rewritable-type optical disks, there are included a phase-change type optical disk where a phase change of recording film is used and a magneto-optical disk where a change of magnetization direction in perpendicular magnetization film is used. The phase-change type optical disk does not need an external magnetizing device and can be easily overwritten. Therefore, it is expected that this type will be predominant in the rewritable-type optical disks as well as the magneto-optical type. In magneto-optical disks, a product with a capacity four times that of first generation magneto-optical disks has been researched, while it is reported that a capacity eight or more times that is technically possible (for example, Honma et al., SPIE, Vol.2338, p.314). Also in phase-change type optical disks, a product standard corresponding to the four-times capacity of magneto-optical disks and a test product development where an application to small-size large-capacity video disk recorder is considered( for example, Okubo et al., 7th Phase Change Optical Recording Symposium, preliminary papers, p.48, and Matsui et al., 7th Phase Change Optical Recording Symposium, preliminary papers, p.54) are suggested. Also in this type, large capacity and high density are important keywords.

In the read-only type, metal reflection film made of Al alloy system is formed on concave-convex pits formed previously on a substrate by injection molding and is used for reproducing. In the recordable type, used is a medium where an alloy composed of low melting point metal such as Te, Bi, Se and Sn or a dye material with an absorption characteristic at a laser wavelength used is thin coated on a substrate. In the rewritable type, magneto-optical disks have a medium composition where alloy thin film composed of rare earth metal such as Tb, Gd, Dy and Ho and transition metal such as Fe, Co and Ni is sandwiched by transparent protective coating film made of, e.g., SiN, and phase-change optical disks have recording film made of chalcogenide such as GeSbTe and InSbTe. Also, for the recording film of the phase-change optical disks, InSe system, InTe system, AsTeGe system, TeOx-GeSn system, TeSeSn system, SbSeBi system and BiSeGe system materials are used. Meanwhile, the above thin films are formed by resistance heating evaporation, electron beam evaporation, sputtering or spin coating.

In the above read-only type, recordable-type and rewritable-type optical disks, concave-convex pits, recordable-type recording film, magneto-optical recording film or phase-change recording film is formed on a rigid substrate. In the read-only type, a signal is continuously reproduced by tracking the concave-convex pits themselves. In the recordable type and rewritable type, recording and reproducing are conducted by using a guide groove for tracking which is previously formed on the rigid substrate. Thus, the conventional optical disks use the substrate on which the guide groove for tracking convergent laser beams are previously formed to record, reproduce and erase information. A most effective way for conducting high-density recording in such optical disks is to increase the track density. Therefore, to narrow the width of the guide groove as well as to shorten the wavelength of laser light to be used has been researched. For example, it is considered to use a substrate with a track pitch of 0.9 to 1.2 μm for laser light with a wavelength of 685 nm, while a substrate with a track pitch of 1.3 to 1.6 μm has been used for laser light with a wavelength of 830 nm.

In such optical disks, narrower tracks are desired for higher-density recording. However, when the track width is so narrowed that the tracking groove width is less than ½ of laser wavelength to be used, it becomes very difficult for laser light to enter inside the groove since the oscillation mode of light to be allowed between both ends of the groove wall is limited. Therefore, the tracking characteristic is highly deteriorated, and it becomes very difficult to record a signal into the groove and to reproduce a signal therefrom. Thus, there is a big problem that it is substantially impossible to use such a narrowed track substrate.

SUMMARY OF THE INVENTION

Accordingly, it is an object of the invention to provide an optical information recording medium which has good characteristics for high-density recording, reproducing and erasing.

According to the invention, an optical information recording medium for recording, reproducing and erasing information by emitting laser light with a wavelength in vacuum of λ, comprises:

a transparent substrate through which the laser light can be transmitted;

a high refractive-index layer which is formed on the transparent substrate;

a guide groove for tracking which is formed on the high refractive-index layer; and a recording layer which is formed on the guide groove for tracking;

wherein a width W of the guide groove for tracking and a refractive index $n_a$ of the high refractive-index layer are so set that the following relation:

$$W > \lambda/(2xn_a)$$

is obtained.

According to another aspect of the invention, an optical information recording medium for reproducing information by emitting laser light with a wavelength in vacuum of λ, comprises:

a transparent substrate through which the laser light can be transmitted;

a high refractive-index layer which is formed on the transparent substrate;

a concave-convex pit which is formed on the high refractive-index layer; and a reflection layer which is formed on the concave-convex pit;

wherein a width $W_p$ of the concave-convex pit and a refractive index $n_a$ of the high refractive-index layer are so set that the following relation:

$$W_p > \lambda/(2xn_a)$$

is obtained.

Meanwhile, to form a member with a refractive index higher than that of a substrate on the substrate is known. For example, Japanese patent application laid-open No.6-150441(1994) discloses an optical information recording medium where a material layer whose optical constant is changed according to its phase transition is formed on a substrate. However, this medium does not use a guide groove for tracking, and the material layer is used for tracking by changing later the optical constant. Thus, a high-density medium cannot be obtained thereby. Also, Japanese patent application laid-open No.5-266514(1993) discloses an optical information recording medium where a high refractive-index layer is formed on a substrate. This high refractive-index layer is used to help the reduction of tracking error since recording film is of a polymeric material with a refractive index close to that of a substrate. Further, Japanese patent application laid-open Nos.5-198022, 5-198002 and 198021(1993) disclose optical information recording mediums where a high refractive-index interference layer is formed on a substrate. This interference layer is formed so as to increase a Kerr rotation angle of magneto-optical recording film by optical interference.

On the other hand, Japanese patent application laid-open No.83-225945(1988) discloses an magneto-optical disk where transparent film with a high refractive index is formed on a substrate with a V-shaped groove. This transparent film is also formed to enhance the optical interference of the magneto-optical disk. Further, Japanese patent application laid-open No.63-29341(1988) discloses an information carrier disk where a high refractive index layer is formed on a transparent substrate. This thin film is formed to prevent thermal deformation during the erasing, not to give a high-density medium. Japanese patent application publication No.61-30329(1986) discloses an optical memory medium where a groove formed on a substrate has a material buried therein with a refractive index different from that of the substrate, thereby giving the even surface. The material is used to eliminate optical defects to improve the tracking and signal characteristics, where the material is of liquid plastics.

As described above, it is conventionally known that a member with a refractive index higher than that of a substrate is formed on the substrate. However, in fact, the conventional techniques give no higher-density medium and are difficult to realize good recording, reproducing and erasing characteristics in the higher-density medium with narrowed track pitches.

BRIEF DESCRIPTION OF THE DRAWINGS

The invention will be explained in more detail in conjunction with the appended drawings, wherein:

FIG. 5 is a cross sectional view showing an optical information recording medium as a comparative example, and FIG. 6 is a cross sectional view showing an optical information recording medium as another comparative example.

DESCRIPTION OF THE PREFERRED EMBODIMENTS

Figure 1:
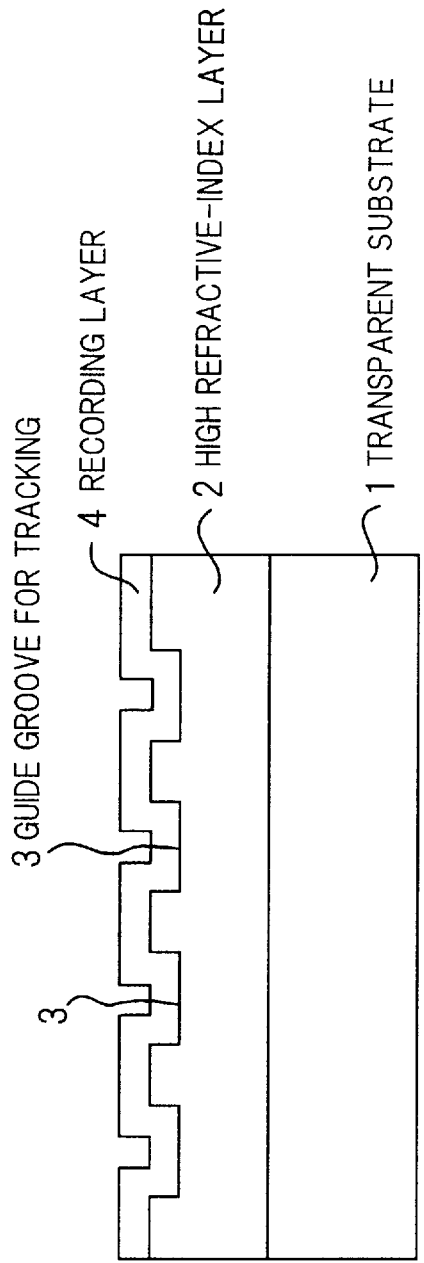
FIG. 1 is a cross sectional view showing an optical information recording medium in a first preferred embodiment according to the invention.

An optical information recording medium in the first preferred embodiment will be explained in FIG. 1. The first embodiment is given as an example of a recordable-type optical disk. As shown in FIG. 1, the recordable-type optical disk comprises a transparent substrate 1, a high refractive-index layer 2 formed on the transparent substrate 1, a guide groove 3 for tracking formed on the high refractive-index layer 2, and a recording layer 4 formed on the guide groove 3. The recording layer 4 is formed by thin coating an alloy material composed of low melting point metal such as Te, Bi, Se and Sn or a dye material with an absorption characteristic at a laser wavelength used on the high refractive-index layer 2. A width W of the guide groove 3 for tracking and a refractive index $n_a$ of the high refractive-index layer 2 are so set that the relation:

$$W > \lambda/(2xn_a)$$

is obtained.

In the optical disk, by forming the guide groove 3 for tracking convergent laser beams on the high refractive-index layer 2, the limitation to laser light entering inside the guide groove 3 occurred when the optical width of the guide groove 3 for tracking is less than ½ of a laser wavelength used can be relaxed, therefore the deterioration of tracking characteristic, lack of signal recording and reproducing characteristics into and from the groove which are caused by the formation of narrowed tracks can be solved. Therefore, a high-density optical information recording medium with a good recording, reproducing and erasing characteristics can be obtained.

Namely, analyzing the behavior of light when the light is supplied into a groove with a certain width, when the groove width is less than ½ of the wavelength of the light, both ends of the groove function to limit the distribution of light electric field in the case that the oscillation direction of light electric field is a TE mode parallel to the groove. Therefore, the distribution of light electric field with a certain intensity cannot exist inside the groove. Then, by setting the refractive index of a medium through which laser light is supplied to the groove to be high, the wavelength of the light is effectively shortened. This technique is found after many researches as to high-density optical recording based upon the basic behavior of light in a high refractive-index medium. Namely, an optical wavelength λ in a medium with a refractive index n is given by:

$$\lambda = \lambda_0/n$$

where a wavelength in vacuum is $\lambda_0$. For example, red light with a wavelength of 680 nm has a wavelength of 227 nm in a medium with a refractive index of 3.0. Instead, when the guide groove with a width of 200 nm is conventionally formed on the substrate with a refractive index of about 1.5, the groove width is less than ½ wavelength to the laser light with a wavelength of 680 nm. Therefore, it becomes very difficult for the laser light to enter into the groove. Then, by forming a groove with this width on a medium with a refractive index of 3.0, the laser light can easily enter into the groove since the groove width is more than ½ wavelength to the laser light with a wavelength of 680 nm.

Though this phenomenon occurs in laser light with a TE mode to oscillate parallel to the groove, about ½ of the characteristic of circular polarization laser light to be used for a ROM disk, recordable disk and phase-change type disk is also subject to the phenomenon since the circular polarization is a combination of a TE mode and a TM mode orthogonal thereto. Also, this phenomenon occurs similarly when the size of a concave-convex pit, which will be described in the following embodiments, is so reduced that the pit width becomes less than ½ wavelength and when the pit length is reduced less than ½ wavelength.

Figure 2:
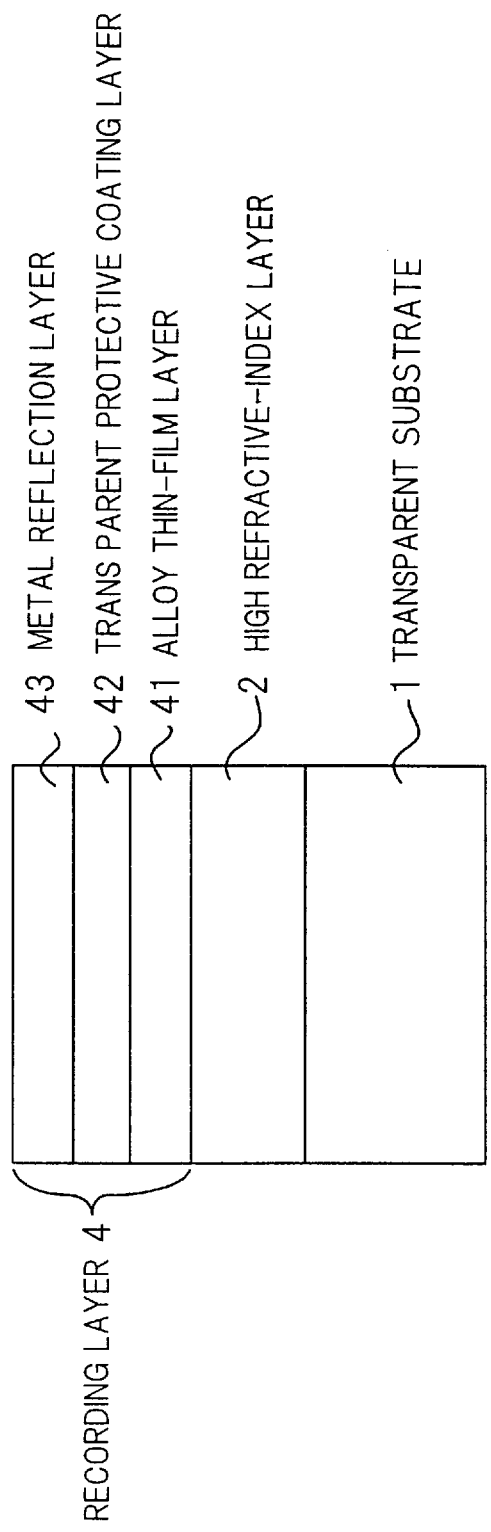
FIG. 2 is a cross sectional view showing main part of an optical information recording medium in a second preferred embodiment according to the invention.

An optical information recording medium in the second preferred embodiment will be explained in FIG. 2, wherein like parts are indicated by like reference numerals as used in FIG. 1. The second embodiment is given as an example of a magneto-optical disk. As shown in FIG. 2, the recordable layer 4 in the first embodiment comprises an alloy thin-film layer 41 which is composed of rare earth metal such as Tb, Gd, Dy and Ho and transition metal such as Fe, Co and Ni and formed on the high refractive-index layer 2, a transparent protective coating layer 42 which is made of, e.g., SiN and formed on the alloy thin-film layer 41, and a metal reflection layer 43 which is made of Al system and formed on the transparent protective coating layer 42.

Figure 3:
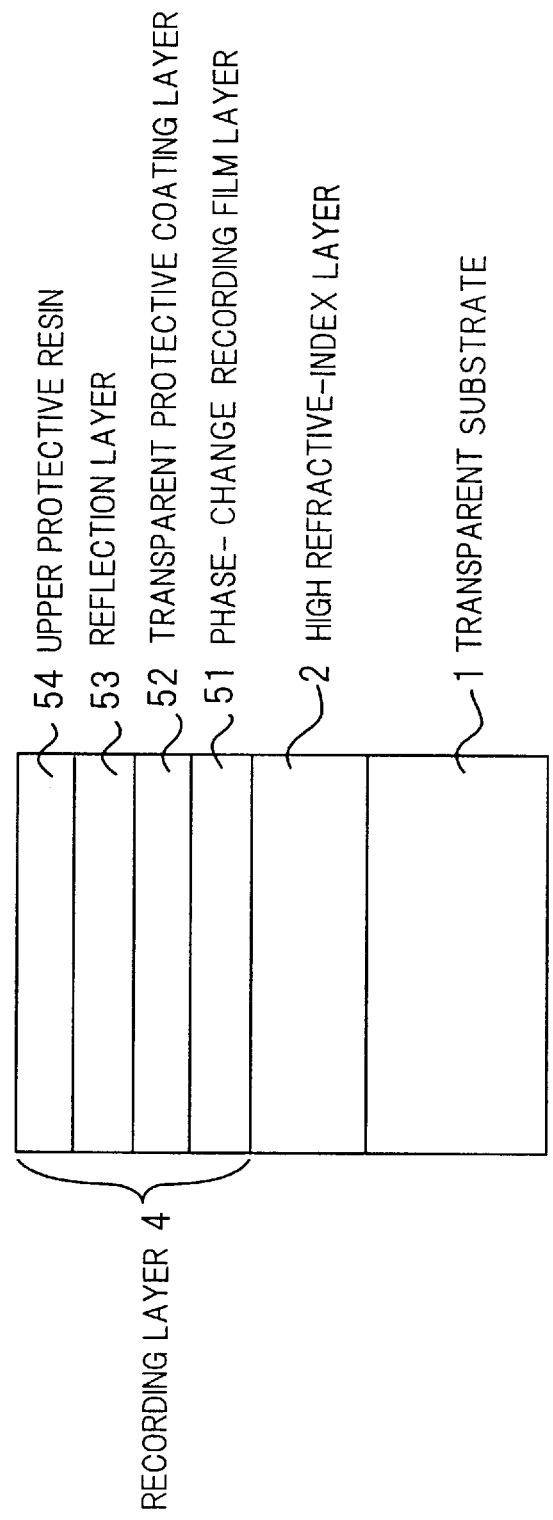
FIG. 3 is a cross sectional view showing main part of an optical information recording medium in a third preferred embodiment according to the invention.

An optical information recording medium in the third preferred embodiment will be explained in FIG. 3, wherein like parts are indicated by like reference numerals as used in FIG. 1. The third embodiment is given as an example of a phase-change type optical disk. As shown in FIG. 3, the recordable layer 4 in the first embodiment comprises a chalcogenide system recording material such as GeSbTe, InSbTe. Namely, the recording layer 4 comprises a phase-change type recording film layer 51 which is made of GeSbTe, InSbTe, InSe system, InTe system, AsTeGe system, TeOx-GeSn system, TeSeSn system, SbSeBi system or BiSeGe system material and formed on the high refractive-index layer 2, a transparent protective coating layer 52 which is made of, e.g., Zng—SiO₂ and formed on the phase-change type recording film layer 51, a reflection layer 53 formed on the transparent protective coating layer 52, and upper protective resin 54 coated on the reflection layer 53.

Figure 4:
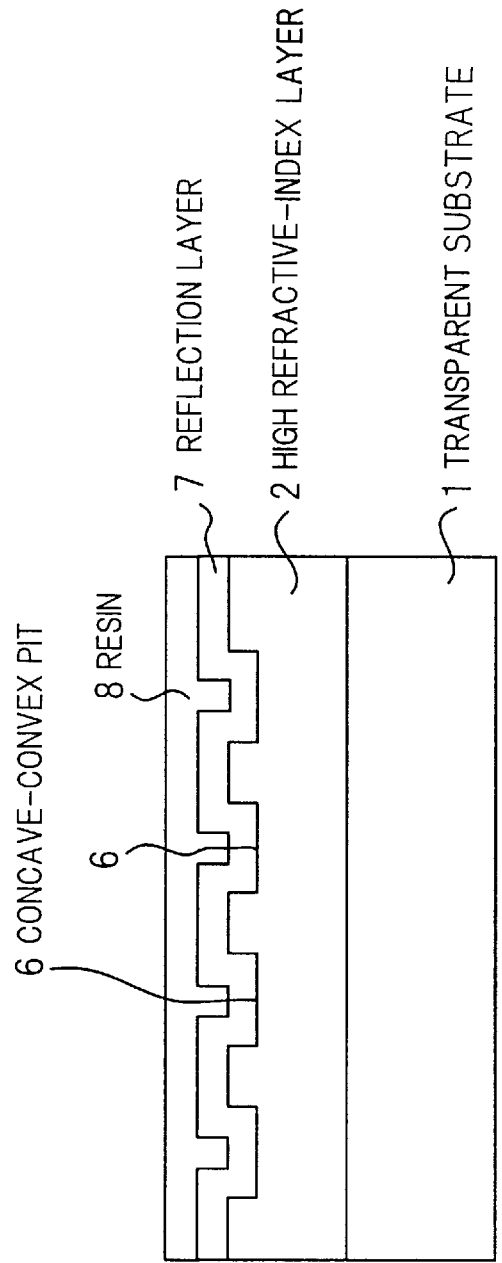
FIG. 4 is a cross sectional view showing an optical information recording medium in a fourth preferred embodiment according to the invention.

An optical information recording medium in the fourth preferred embodiment will be explained in FIG. 4, wherein like parts are indicated by like reference numerals as used in FIG. 1. The fourth embodiment is given as an example of a read-only type optical disk. As shown in FIG. 4, the read-only type optical disk in the fourth embodiment comprises a transparent substrate 1, a high refractive-index layer 2 formed on the transparent substrate 1, convex-concave pits 6 formed on the high refractive-index layer 2, and a reflection layer 7 formed on the concave-convex pits 6. Usually, resin 8 for protection is coated on the reflection layer 7. A width $W_p$ of the concave-convex pit 6 and a refractive index $n_a$ of the high refractive-index layer 2 are so set that the relation:

$$W_p > \lambda/(2 \times n_a)$$

is obtained.

In the optical disk, by forming the concave-convex pits 6 on the high refractive-index layer 2, the limitation to laser light entering inside the concave-convex pit 6 occurred when the optical width of the pit 6 for tracking is less than ½ of a laser wavelength used can be relaxed, therefore the deterioration of tracking characteristic, lack of signal recording and reproducing characteristics into and from the pit which are caused by the formation of concave-convex pits with a narrowed width can be solved. Therefore, a high-density optical information recording medium with a good recording, reproducing and erasing characteristics can be obtained.

Meanwhile, the above thin films, i.e., recording film, reflection film and protective coating film, are formed by resistance heating evaporation, electron beam evaporation, sputtering or spin coating. Also, the resin for protection is formed by spin coating or screen printing.

Next, the formation of the high refractive-index layer, guide groove and concave-convex pit, which are characteristic of the invention, will be explained below. Usually, in an optical information recording medium such as an optical disk, the transparent substrate 1 is made of a resin such as polycarbonate, PMMA or polyolefin. The refractive index of the resin is about 1.5. Thus, the refractive index of the high refractive-index layer 2, which is used to form the guide groove or concave-convex pit, needs to be at least more than 1.5. In particular, the higher the refractive index is, the shorter the laser wavelength in the medium becomes, thereby enhancing the effect of the high refractive-index layer 2. For example, the high refractive-index layer 2 is made of Si, Si oxide, Si nitride, Ge, Ge oxide, Ge nitride, ZnS, sulfide including ZnS as a main component, ZnSe, selenide including ZnSe as a main component, $Sb_2S_3$, sulfide including $Sb_2S_3$ as a main component, CdS, sulfide including CdS as a main component, $Bi_2O_3$, oxide including $Bi_2O_3$ as a main component, $CeO_2$, oxide including $CeO_2$ as a main component, $ZrO_2$, oxide including $ZrO_2$ as a main component. The high refractive-index layer 2 is formed by resistance heating evaporation, electron beam evaporation or sputtering.

The guide groove and concave-convex pit on the high refractive-index layer 2 are formed by known photolithography. Namely, a resist is first coated on the high refractive-index layer 2 by, e.g., spin coating. Then, by using , e.g., laser exposure, the resist is continuously or intermittently removed to give a predetermined shape. In case of a continuous guide groove, the resist is removed to give a continuous-spiral or concentric shape. On the other hand, to form the concave-convex pit, laser exposure is conducted using a predetermined modulation signal and the resist is then removed. Furthermore, by etching with an acid or alkaline solution or plasma etching, part where the resist is removed is etched to form the groove with a desired depth, width and length or the concave-convex pit on the high refractive-index layer 2. Then, by removing the remaining resist by an organic solvent, a medium with the guide groove or concave-convex pit can be obtained.

Next, examples along the above embodiments of the invention will be described with comparative examples.

EXAMPLE 1

With reference to FIGS. 1 and 2, a magneto-optical disk is fabricated by forming the high refractive-index layer 2 with the guide groove 3 for tracking on the transparent substrate 1, then forming the alloy thin-film layer 41 as magneto-optical recording film(recording layer 4) composed of rare earth metal-transition metal on the high refractive-index layer 2, then forming the transparent protective coating layer 42 on the alloy thin-film layer 41, further forming the metal reflection layer 43 on the transparent protective coating layer 42. The transparent substrate 1 used is a glass flat substrate with a diameter of 130 mm and a thickness of 1.2 mm. On the substrate 1, a 800 nm thick Si high refractive-index layer 2 is formed by sputtering, then a 0.2 μm wide spiral guide groove 3 for tracking is formed thereon within a radius range of 30 to 60 mm by plasma etching. The track pitch is set to be 0.6 μm. Then, by sputtering, a 25 nm thick TbFeCo magneto-optical recording film layer 41, a 20 nm thick SiN transparent protective coating layer 42 and a 80 nm Al metal reflection layer 43 are formed.

The recording, reproducing and erasing tests of the magneto-optical disk obtained according to the invention are conducted. In these tests, an optical head with a semiconductor laser with a wavelength of 680 nm is used. The polarization direction of the laser light is a TE mode where the electric field oscillates orthogonally to the guide groove 3 for tracking. Under the conditions of the wavelength of 680 nm, groove width of 0.2 μm and refractive index of the high refractive-index layer 2 of 3.5, the following relation:

$$0.2 \ \mu m > 680 \ nm/(2 \times 3.5)$$

is obtained. Thus, the requirement of the invention is satisfied. The numerical aperture of an objective lens used is 0.6. After once magnetizing the recording film of the magneto-optical disk in one direction, a 8.4 MHz signal(duty: 50%) is recorded rotating the disk at a rate of 3600 rpm while servo-applying to the 0.2 μm wide groove of a 30 mm radius track. When the reproducing of the same track is conducted, a good reproduction signal is obtained.

COMPARATIVE EXAMPLE 1

As a comparative example, a magneto-optical disk as shown in FIG. 5 is fabricated by forming a low refractive-index dielectric layer 2A with a guide groove 3 for tracking on a transparent substrate 1, then forming the alloy thin-film layer 41 as magneto-optical recording film(recording layer 4) composed of rare earth metal-transition metal on the low refractive-index dielectric layer 2A, then forming the transparent protective coating layer 42 on the alloy thin-film layer 41, further forming the metal reflection layer 43 on the transparent protective coating layer 42. The transparent substrate 1 used is a glass flat substrate with a diameter of 130 mm and a thickness of 1.2 mm. On the substrate 1, a 800 nm thick $SiO_2$ low refractive-index dielectric layer 2A is formed by sputtering, then a 0.2 μm wide spiral guide groove 3 for tracking is formed thereon within a radius range of 30 to 60 mm by plasma etching. The track pitch is set to be 0.6 μm. Then, by sputtering, a 25 nm thick TbFeCo magneto-optical recording film layer 41, a 20 nm thick SiN transparent protective coating layer 42 and a 80 nm Al metal reflection layer 43 are formed.

The recording, reproducing and erasing tests of the magneto-optical disk obtained are conducted. In these tests, an optical head with a semiconductor laser with a wavelength of 680 nm is used The polarization direction of the laser light is a TE mode where the electric field oscillates orthogonally to the guide groove 3 for tracking. Under the conditions of the wavelength of 680 nm, groove width of 0.2 μm and refractive index of the low refractive-index layer 2A of 1.45, the following relation:

$$0.2 \ \mu m < 680 \ nm/(2 \times 1.45)$$

is obtained. Thus, the requirement of the invention is not satisfied. The numerical aperture of an objective lens used is 0.6. After once magnetizing the recording film of the magneto-optical disk in one direction, a 8.4 MHz signal (duty: 50%) is recorded rotating the disk at a rate of 3600 rpm while servo-applying to the 0.2 μm wide groove of a 30 mm radius track. When the reproducing of the same track is conducted, no reproduction signal is obtained.

EXAMPLE 2

With reference to FIG. 4, a read-only type optical disk is fabricated by forming the high refractive-index layer 2 with the concave-convex pit 6 on the transparent substrate 1, then forming the reflection layer 7 and protective resin 8 thereon. The transparent substrate 1 used is a glass flat substrate with a diameter of 120 mm and a thickness of 0.6 mm. On the substrate 1, a 800 nm thick Si high refractive-index layer 2 is formed by sputtering, then a 0.2 μm wide spiral convex-concave pit 6 is formed thereon within a radius range of 23 to 58 mm by plasma etching. The track pitch is set to be 0.55 μm. Then, by sputtering, a 100 nm thick Al system reflection film is formed. Further, an about 10 μm thick ultraviolet-setting resin(SD-301, produced by Dai-Nihon Ink Co.) for protection is coated, then set by ultraviolet radiation.

The reproducing test of the read-only optical disk obtained according to the invention is conducted. In this test, an optical head with a semiconductor laser with a wavelength of 640 nm is used. The optical head is of a type to emit circular polarization laser light. Under the conditions of the wavelength of 640 nm, pit width of 0.2 μm and refractive index of the high refractive-index layer 2 of 3.5, the following relation:

$$0.2 \ \mu m > 640 \ nm/(2 \times 3.5)$$

is obtained. Thus, the requirement of the invention is satisfied. The numerical aperture of an objective lens used is 0.6. When the signal reproducing from the 0.2 μm wide concave-convex pit of a 40 mm radius track is conducted while rotating the disk at a linear rate of 4.8 m/s, a good reproduction signal is obtained.

COMPARATIVE EXAMPLE 2

As a comparative example, a read-only type optical disk as shown in FIG. 6 is fabricated by forming a low refractive-index dielectric layer 2A with the concave-convex pit 6 on the transparent substrate 1, then forming the reflection layer 7 and protective resin 8 thereon. The transparent substrate 1 used is a glass flat substrate with a diameter of 120 mm and a thickness of 0.6 mm. On the substrate 1, a 800 nm thick $SiO_2$ low refractive-index dielectric layer 2A is formed by sputtering, then a 0.2 μm wide spiral convex-concave pit 6 is formed thereon within a radius range of 23 to 58 mm by plasma etching. The track pitch is set to be 0.55 μm. Then, by sputtering, a 100 nm thick Al system reflection film is formed. Further, an about 10 μm thick ultraviolet-setting resin(SD-301, produced by Dai-Nihon Ink Co.) for protection is coated, then set by ultraviolet radiation.

The reproducing test of the read-only optical disk obtained is conducted. In this test, an optical head with a semiconductor laser with a wavelength of 640 nm is used. The optical head is of a type to emit circular polarization laser light. Under the conditions of the wavelength of 640 nm, pit width of 0.2 μm and refractive index of the low refractive-index dielectric layer 2A of 1.45, the following relation:

0.2 μm<640 nm/(2×1.45)

is obtained. Thus, the requirement of the invention is not satisfied. The numerical aperture of an objective lens used is 0.6. When the signal reproducing from the 0.2 μm wide concave-convex pit of a 40 mm radius track is conducted while rotating the disk at a linear rate of 4.8 m/s, only a reproduction signal with a low modulation ratio is obtained while showing a signal characteristic with a poor error rate.

EXAMPLE 3

With reference to FIGS. 1 and 3, a phase-change type optical disk is fabricated by forming the high refractive-index layer 2 with the guide groove 3 for tracking on the transparent substrate 1, then forming the phase-change recording film layer 51 as the recording layer 4 on the high refractive-index layer 2, then forming the transparent protective coating layer 52 on the phase-change recording film layer 51, then forming the metal reflection layer 53 on the transparent protective coating layer 52, further coating the upper protective resin 54 on the metal reflection layer 53. The transparent substrate 1 used is a glass flat substrate with a diameter of 130 mm and a thickness of 1.2 mm. On the substrate 1, a 800 nm thick Si high refractive-index layer 2 is formed by sputtering, then a 0.2 μm wide spiral guide groove 3 for tracking is formed thereon within a radius range of 30 to 60 mm by plasma etching. The track pitch is set to be 0.6 μm. Then, by sputtering, a 10 nm thick GeSbTe phase-change recording film layer 51, a 20 nm thick ZnS—SiO$_2$ transparent protective coating layer 52 and a 60 nm Al metal reflection layer 53 are formed. Further, an about 10 μm thick ultraviolet-setting resin(SD-301, produced by Dai-Nihon Ink Co.) as the protective layer 54 is coated, then set by ultraviolet radiation.

The recording, reproducing and erasing tests of the phase-change type optical disk obtained according to the invention are conducted. In these tests, an optical head with a semiconductor laser with a wavelength of 680 nm is used. The optical head is of a type to emit circular polarization laser light. Under the conditions of the wavelength of 680 nm, groove width of 0.2 μm and refractive index of the high refractive-index layer 2 of 3.5, the following relation:

0.2 μm>680 nm/(2×3.5)

is obtained. Thus, the requirement of the invention is satisfied. The numerical aperture of an objective lens used is 0.6. After initializing the phase-variable optical disk, a 13.5 MHz signal(duty: 50%) is recorded rotating the disk at a linear rate of 12 m/s while servo-applying to the 0.2 μm wide groove of a 45 mm radius track. When the reproducing of the same track is conducted, a good reproduction signal as well as a sufficient modulation ratio is obtained.

EXAMPLE 4

A magneto-optical disk similar to that in Example 1, where the high refractive-index layer 2 is of Ge, is fabricated.

The recording, reproducing and erasing tests of the magneto-optical disk obtained are conducted. In these tests, an optical head with a semiconductor laser with a wavelength of 680 nm is used. The polarization direction of the laser light is a TE mode where the electric field oscillates orthogonally to the guide groove 3 for tracking. Under the conditions of the wavelength of 680 nm, groove width of 0.2 μm and refractive index of the high refractive-index layer 2 of 4.0, the following relation:

0.2 μm>680 nm/(2×4.0)

is obtained. Thus, the requirement of the invention is satisfied. The numerical aperture of an objective lens used is 0.6. After once magnetizing the recording film of the magneto-optical disk in one direction, a 8.4 MHz signal(duty: 50%) is recorded rotating the disk at a rate of 3600 rpm while servo-applying to the 0.2 μm wide groove of a 30 mm radius track. When the reproducing of the same track is conducted, a good reproduction signal is obtained.

EXAMPLE 5

A magneto-optical disk similar to that in Example 1, where the high refractive-index layer 2 is of nitride including Si as a main component, is fabricated.

The recording, reproducing and erasing tests of the magneto-optical disk obtained are conducted. The nitride is prepared by reactive sputtering where a Si target is sputtered in an atmosphere of Ar and N$_2$. The nitride, where nitrogen is reduced as compared to the stoichiometric composition, has a refractive index of 2.6. In these tests, an optical head with a semiconductor laser with a wavelength of 680 nm is used. The polarization direction of the laser light is a TE mode where the electric field oscillates orthogonally to the guide groove 3 for tracking. Under the conditions of the wavelength of 680 nm, groove width of 0.2 μm and refractive index of the high refractive-index layer 2 of 2.6, the following relation:

0.2 μm>680 nm/(2×2.6)

is obtained. Thus, the requirement of the invention is satisfied. The numerical aperture of an objective lens used is 0.6. After once magnetizing the recording film of the magneto-optical disk in one direction, a 8.4 MHz signal(duty: 50%) is recorded rotating the disk at a rate of 3600 rpm while servo-applying to the 0.2 μm wide groove of a 30 mm radius track. When the reproducing of the same track is conducted, a good reproduction signal is obtained.

EXAMPLE 6

A magneto-optical disk similar to that in Example 1, where the high refractive-index layer 2 is of nitride including Ge as a main component, is fabricated.

The recording, reproducing and erasing tests of the magneto-optical disk obtained are conducted. The nitride is prepared by reactive sputtering where a Ge target is sputtered in an atmosphere of Ar and N$_2$. The nitride, where nitrogen is reduced as compared to the stoichiometric composition, has a refractive index of 2.9. In these tests, an optical head with a semiconductor laser with a wavelength of 680 nm is used. The polarization direction of the laser light is a TE mode where the electric field oscillates orthogonally to the guide groove 3 for tracking. Under the conditions of the wavelength of 680 nm, groove width of 0.2 μm and refractive index of the high refractive-index layer 2 of 2.9, the following relation:

0.2 μm>680 nm/(2×2.9)

is obtained. Thus, the requirement of the invention is satisfied. The numerical aperture of an objective lens used is 0.6. After once magnetizing the recording film of the magneto-optical disk in one direction, a 8.4 MHz signal(duty: 50%) is recorded rotating the disk at a rate of 3600 rpm while servo-applying to the 0.2 μm wide groove of a 30 mm radius track. When the reproducing of the same track is conducted, a good reproduction signal is obtained.

EXAMPLE 7

A read-only type optical disk similar to that in Example 2, where the high refractive-index layer 2 with the concave-convex pit 6 is of oxide including Si as a main component, is fabricated. The oxide is prepared by reactive sputtering where a Si target is sputtered in an atmosphere of Ar and $O_2$. The oxide, where oxygen is reduced as compared to the stoichiometric composition, has a refractive index of 2.4.

The reproducing test of the read-only optical disk obtained according to the invention is conducted. In this test, an optical head with a semiconductor laser with a wavelength of 640 nm is used. The optical head is of a type to emit circular polarization laser light. Under the conditions of the wavelength of 640 nm, pit width of 0.2 μm and refractive index of the high refractive-index layer 2 of 2.4, the following relation:

0.2 μm>640 nm/(2×2.4)

is obtained. Thus, the requirement of the invention is satisfied. The numerical aperture of an objective lens used is 0.6. When the signal reproducing from the 0.2 μm wide concave-convex pit of a 40 mm radius track is conducted while rotating the disk at a linear rate of 4.8 m/s, a good reproduction signal is obtained.

EXAMPLE 8

A read-only type optical disk similar to that in Example 2, where the high refractive-index layer 2 with the concave-convex pit 6 is of oxide including Ge as a main component, is fabricated. The oxide is prepared by reactive sputtering where a Ge target is sputtered in an atmosphere of Ar and $O_2$. The oxide, where oxygen is reduced as compared to the stoichiometric composition, has a refractive index of 2.7.

The reproducing test of the read-only optical disk obtained according to the invention is conducted. In this test, an optical head with a semiconductor laser with a wavelength of 640 nm is used. The optical head is of a type to emit circular polarization laser light. Under the conditions of the wavelength of 640 nm, pit width of 0.2 μm and refractive index of the high refractive-index layer 2 of 2.7, the following relation:

0.2 μm>640 nm/(2×2.7)

is obtained. Thus, the requirement of the invention is satisfied. The numerical aperture of an objective lens used is 0.6. When the signal reproducing from the 0.2 μm wide concave-convex pit of a 40 mm radius track is conducted while rotating the disk at a linear rate of 4.8 m/s, a good reproduction signal is obtained.

EXAMPLE 9

A read-only type optical disk similar to that in Example 2, where the high refractive-index layer 2 with the concave-convex pit 6 is of ZnS, is fabricated. ZnS is prepared by reactive sputtering where a ZnS target is sputtered in an atmosphere of Ar. ZnS has a refractive index of 2.35.

The reproducing test of the read-only optical disk obtained according to the invention is conducted. In this test, an optical head with a semiconductor laser with a wavelength of 640 nm is used. The optical head is of a type to emit circular polarization laser light. Under the conditions of the wavelength of 640 nm, pit width of 0.2 μm and refractive index of the high refractive-index layer 2 of 2.35, the following relation:

0.2 μm>640 nm/(2×2.35)

is obtained. Thus, the requirement of the invention is satisfied. The numerical aperture of an objective lens used is 0.6. When the signal reproducing from the 0.2 μm wide concave-convex pit of a 40 mm radius track is conducted while rotating the disk at a linear rate of 4.8 m/s, a good reproduction signal is obtained.

EXAMPLE 10

A phase-change type optical disk similar to that in Example 3, where the high refractive-index layer 2 with the guide groove 3 for tracking is of ZnSe, is fabricated. ZnSe is prepared by reactive sputtering where a ZnSe target is sputtered in an atmosphere of Ar. ZnSe has a refractive index of 2.58.

The recording, reproducing and erasing tests of the phase-change type optical disk obtained according to the invention are conducted. In these tests, an optical head with a semiconductor laser with a wavelength of 680 nm is used. The optical head is of a type to emit circular polarization laser light. Under the conditions of the wavelength of 680 nm, groove width of 0.2 μm and refractive index of the high refractive-index layer 2 of 2.58, the following relation:

0.2 μm>680 nm/(2×2.58)

is obtained. Thus, the requirement of the invention is satisfied. The numerical aperture of an objective lens used is 0.6. After initializing the phase-change optical disk, a 13.5 MHz signal(duty: 50%) is recorded rotating the disk at a linear rate of 12 m/s while servo-applying to the 0.2 μm wide groove of a 45 mm radius track. When the reproducing of the same track is conducted, a good reproduction signal as well as a sufficient modulation factor is obtained.

EXAMPLE 11

A read-only type optical disk similar to that in Example 2, where the high refractive-index layer 2 with the concave-convex pit 6 is of $TiO_2$, is fabricated. $TiO_2$ is prepared by reactive sputtering where a $TiO_2$ target is sputtered in an atmosphere of Ar and $O_2$. $TiO_2$ has a refractive index of 2.6.

The reproducing test of the read-only optical disk obtained according to the invention is conducted. In this test, an optical head with a semiconductor laser with a wavelength of 640 nm is used. The optical head is of a type to emit circular polarization laser light. Under the conditions of the wavelength of 640 nm, pit width of 0.2 μm and refractive index of the high refractive-index layer 2 of 2.6, the following relation:

0.2 μm>640 nm/(2×2.6)

is obtained. Thus, the requirement of the invention is satisfied. The numerical aperture of an objective lens used is 0.6. When the signal reproducing from the 0.2 μm wide concave-convex pit of a 40 mm radius track is conducted while rotating the disk at a linear rate of 4.8 m/s, a good reproduction signal is obtained.

EXAMPLE 12

A phase-change type optical disk similar to that in Example 3, where the high refractive-index layer 2 with the guide groove 3 for tracking is of $Sb_2S_3$, is fabricated. $Sb_2S_3$ is prepared by reactive sputtering where a $Sb_2S_3$ target is sputtered in an atmosphere of Ar. $Sb_2S_3$ has a refractive index of 3.0.

The recording, reproducing and erasing tests of the phase-change type optical disk obtained according to the invention are conducted. In these tests, an optical head with & semiconductor laser with a wavelength of 680 nm is used. The optical head is of a type to emit circular polarization laser light. Under the conditions of the wavelength of 680 nm, groove width of 0.2 μm and refractive index of the high refractive-index layer 2 of 3.0, the following relation:

$$0.2 \text{ μm} > 680 \text{ nm}/(2 \times 3.0)$$

is obtained. Thus, the requirement of the invention is satisfied. The numerical aperture of an objective lens used is 0.6. After initializing the phase-variable optical disk, a 13.5 MHz signal(duty: 50%) is recorded rotating the disk at a linear rate of 12 m/s while servo-applying to the 0.2 μm wide groove of a 45 mm radius track. When the reproducing of the same track is conducted, a good reproduction signal as well as a sufficient modulation ratio is obtained.

EXAMPLE 13

A phase-change type optical disk similar to that in Example 3, where the high refractive-index layer 2 with the guide groove for tracking is of CdS, is fabricated. CdS is prepared by reactive sputtering where a CdS target is sputtered in an atmosphere of Ar. CdS has a refractive index of 2.6.

The recording, reproducing and erasing tests of the phase-change type optical disk obtained according to the invention are conducted. In these tests, an optical head with a semiconductor laser with a wavelength of 680 nm is used. The optical head is of a type to emit circular polarization laser light. Under the conditions of the wavelength of 680 nm, groove width of 0.2 μm and refractive index of the high refractive-index layer 2 of 2.6, the following relation:

$$0.2 \text{ μm} > 680 \text{ nm}/(2 \times 2.6)$$

is obtained. Thus, the requirement of the invention is satisfied. The numerical aperture of an objective lens used is 0.6. After initializing the phase-variable optical disk, a 13.5 MHz signal(duty: 50%) is recorded rotating the disk at a linear rate of 12 m/s while servo-applying to the 0.2 μm wide groove of a 45 mm radius track. When the reproducing of the same track is conducted, a good reproduction signal as well as a sufficient modulation ratio is obtained.

EXAMPLE 14

A read-only type optical disk similar to that in Example 2, where the high refractive-index layer 2 with the concave-convex pit 6 is of $Bi_2O_3$, is fabricated. $Bi_2O_3$ is prepared by reactive sputtering where a $Bi_2O_3$ target is sputtered in an atmosphere of Ar and $O_2$. $Bi_2O_3$ has a refractive index of 2.45.

The reproducing test of the read-only optical disk obtained according to the invention is conducted. In this test, an optical head with a semiconductor laser with a wavelength of 640 nm is used. The optical head is of a type to emit circular polarization laser light. Under the conditions of the wavelength of 640 nm, pit width of 0.2 μm and refractive index of the high refractive-index layer 2 of 2.45, the following relation:

$$0.2 \text{ μm} > 640 \text{ nm}/(2 \times 2.45)$$

is obtained. Thus, the requirement of the invention is satisfied. The numerical apertu e of an objective lens used is 0.6. When the signal reproducing from the 0.2 μm wide concave-convex pit of a 40 mm radius track is conducted while rotating the disk at a linear rate of 4.8 m/s, a good reproduction signal is obtained.

EXAMPLE 15

A read-only type optical disk similar to that in Example 2, where the high refractive-index layer 2 with the concave-convex pit 6 is of $CeO_2$, is fabricated. $CeO_2$ is prepared by reactive sputtering where a $CeO_2$ target is sputtered in an atmosphere of Ar and $O_2$. $CeO_2$ has a refractive index of 2.25.

The reproducing test of the read-only optical disk obtained according to the invention is conducted. In this test, an optical head with a semiconductor laser with a wavelength of 640 nm is used. The optical head is of a type to emit circular polarization laser light. Under the conditions of the wavelength of 640 nm, pit width of 0.2 μm and refractive index of the high refractive-index layer 2 of 2.25, the following relation:

$$0.2 \text{ μm} > 640 \text{ nm}/(2 \times 2.25)$$

is obtained. Thus, the requirement of the invention is satisfied. The numerical aperture of an objective lens used is 0.6. When the signal reproducing from the 0.2 μm wide concave-convex pit of a 40 mm radius track is conducted while rotating the disk at a linear rate of 4.8 m/s, a good reproduction signal is obtained.

EXAMPLE 16

A read-only type optical disk similar to that in Example 2, where the high refractive-index layer 2 with the concave-convex pit 6 is of $ZrO_2$, is fabricated. $ZrO_2$ is prepared by reactive sputtering where a $ZrO_2$ target isisputtered in an atmosphere of Ar and $O_2$. $ZrO_2$ has a refractive index of 2.15.

The reproducing test of the read-only optical disk obtained according to the invention is conducted. In this test, an optical head with a semiconductor laser with a wavelength of 640 nm is used. The optical head is of a type to emit circular polarization laser light. Under t e conditions of the wavelength of 640 nm, pit width of 0.2 μm and refractive index of the high refractive-index layer 2 of 2.15, the following relation:

$$0.2 \text{ μm} > 640 \text{ nm}/(2 \times 2.15)$$

is obtained. Thus, the requirement of the invention is satisfied. The numerical aperture of an objective lens used is 0.6. When the signal reproducing from the 0.2 μm wide concave-convex pit of a 40 mm radius track is conducted while rotating the disk at a linear rate of 4.8 m/s, a good reproduction signal is obtained.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An optical information recording medium for recording, reproducing and erasing information by emitting laser light with a wavelength in vacuum of $\lambda$, comprising:

a transparent substrate through which said laser light is transmitted;

a high refractive-index layer which is formed on said transparent substrate;

a guide groove for tracking which is formed on said high refractive-index layer; and a recording layer which is formed on said guide groove for tracking;

wherein a width W of said guide groove for tracking and a refractive index $n_a$ of said high refractive-index layer are selected so that the following relation:

$$W > \lambda/(2 x n_a)$$

is obtained.

2. An optical information recording medium, according to claim 1, wherein:

said optical information recording medium is a recordable-type optical disk; and said recording layer is made of an alloy material composed of low-melting-point metal such as Te, Bi, Se and Sn or a dye material having an absorption characteristic at a laser wavelength to be used.

3. An optical information recording medium, according to claim 1, wherein:

said optical information recording medium is a rewritable-type magneto-optical disk; and said recording layer is composed of an alloy thin-film layer which is made of rare earth metal such as Tb, Gd, Dy and Ho and transition metal such as Fe, Co and Ni.

4. An optical information recording medium, according to claim 1, wherein:

said optical information recording medium is a phase-change type optical disk; and said recording layer is made of GeSbTe, InSbTe, InSe system, InTe system, AsTeGe system, TeOx-GeSn system, TeSeSn system, SbSeBi system or BiSeGe system material.

5. An optical information recording medium for reproducing information by emitting laser light with a wavelength in vacuum of $\lambda$, comprising:

a transparent substrate through which said laser light is transmitted;

a high refractive-index layer which is formed on said transparent substrate;

a concave-convex pit which is formed on said high refractive-index layer; and a reflection layer which is formed on said concave-convex pit;

wherein a width $W_p$ of said concave-convex pit and a refractive index $n_a$ of said high refractive-index layer are selected so that the following relation:

$$W_p > \lambda/(2 x n_a)$$

is obtained.

6. An optical information recording medium, according to claim 1, wherein:

said high refractive-index layer is made of a material Si, Si oxide including Si as a main component, Si nitride including Si as a main component, Ge, Ge oxide including Ge as a main component, Ge nitride including Ge as a main component, ZnS, ZnSe, $TiO_2$, $Sb_2S_3$, CdS, $Bi_2O_3$, $CeO_2$ or $ZrO_2$, or a material including one of said materials as a main component.

7. An optical information recording medium, according to claim 2, wherein:

said high refractive-index layer is made of a material of Si, Si oxide including Si as a main component, Si nitride including Si as a main component, Ge, Ge oxide including Ge as a main component, Ge nitride including Ge as a main component, ZnS, ZnSe, $TiO_2$, $Sb_2S_3$, CdS, $Bi_2O_3$, $CeO_2$ or $ZrO_2$, or a material including one of said materials as a main component.

8. An optical information recording medium, according to claim 3, wherein:

said high refractive-index layer is made of a material Si, Si oxide including Si as a main component, Si nitride including Si as a main component, Ge, Ge oxide including Ge as a main component, Ge nitride including Ge as a main component, ZnS, ZnSe, $TiO_2$, $Sb_2S_3$, CdS, $Bi_2O_3$, $CeO_2$ or $ZrO_2$, or a material including any one of said materials as a main component.

9. An optical information recording medium, according to claim 4, wherein:

said high refractive-index layer is made of a material Si, Si oxide including Si as a main component, Si nitride including Si as a main component, Ge, Ge oxide including Ge as a main component, Ge nitride including Ge as a main component, ZnS, ZnSe, $TiO_2$, $Sb_2S_3$, CdS, $Bi_2O_3$, $CeO_2$ or $ZrO_2$, or A material including one of said materials as a main component.

10. An optical information recording medium, according to claim 5, wherein:

said high refractive-index layer is made of a material Si, Si oxide including Si as a main component, Si nitride including Si as a main component, Ge, Ge oxide including Ge as a main component, Ge nitride including Ge as a main component, ZnS, ZnSe, $TiO_2$, $Sb_2S_3$, CdS, $Bi_2O_3$, $CeO_2$ or $ZrO_2$, or a material including one of said materials as a main component.

11. An optical information recording medium, according to claim 1, wherein the optical information recording medium contains a single high refractive-index layer formed on said transparent substrate.

12. An optical information recording medium, according to claim 5, wherein said optical information recording medium contains a single high refractive-index layer formed on said transparent substrate.

* * * * *

UNITED STATES PATENT AND TRADEMARK OFFICE
CERTIFICATE OF CORRECTION

PATENT NO. : 5,878,022
DATED : March 2, 1999
INVENTOR(S) : Mitsuya OKADA, and Masatsugu OGAWA It is certified that error appears in the above-identified patent and that said Letters Patent is hereby corrected as shown below:

Column 3, line 45, delete " No. 83-225945 (1988)" and insert --No. 63-225945 (1988)--.

Column 5, line 41, delete "A1" and insert --Al--;

Column 5, line 56, delete "Zng" and insert --ZnS--;

Column 7, line 67, between "used The", insert --.--.

Signed and Sealed this

Twenty-first Day of September, 1999

Attest:

Attesting Officer

Q. TODD DICKINSON

Acting Commissioner of Patents and Trademarks